(12) United States Patent
Lazarev et al.

(10) Patent No.: US 7,733,443 B2
(45) Date of Patent: Jun. 8, 2010

(54) LCD COMPRISING BACKLIGHT AND REFLECTIVE POLARIZER ON FRONT PANEL

(75) Inventors: Pavel I. Lazarev, London (GB); Michael V. Paukshto, Foster City, CA (US)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 458 days.

(21) Appl. No.: 10/956,393

(22) Filed: Oct. 1, 2004

(65) Prior Publication Data

US 2005/0200771 A1 Sep. 15, 2005

Related U.S. Application Data

(60) Provisional application No. 60/551,935, filed on Mar. 9, 2004.

(51) Int. Cl.
G02F 1/1335 (2006.01)
(52) U.S. Cl. .................................. 349/96; 349/115
(58) Field of Classification Search .................. 349/96
See application file for complete search history.

(56) References Cited

U.S. PATENT DOCUMENTS

| | | | |
|---|---|---|---|
| 4,084,883 A | 4/1978 | Eastman et al. | |
| 4,364,640 A | 12/1982 | Kruger et al. | |
| 5,190,365 A | 3/1993 | Cordy, Jr. | |
| 5,587,816 A | 12/1996 | Gunjima et al. | |
| 5,828,488 A | 10/1998 | Ouderkirk et al. | |
| 5,982,540 A | 11/1999 | Koike et al. | |
| 6,025,897 A | 2/2000 | Weber et al. | |
| 6,088,067 A * | 7/2000 | Willett et al. | 349/5 |
| 6,160,595 A | 12/2000 | Kishimoto | |
| 6,163,351 A | 12/2000 | Nakayama | |
| 6,172,809 B1 | 1/2001 | Koike et al. | |
| 6,361,031 B1 | 3/2002 | Shores et al. | |
| 6,464,367 B2 | 10/2002 | Ito et al. | |
| 6,542,208 B1 * | 4/2003 | Akiyama | 349/96 |
| 6,583,284 B1 * | 6/2003 | Sidorenko et al. | 544/342 |
| 6,688,751 B2 | 2/2004 | Lee et al. | |
| 6,767,594 B1 * | 7/2004 | Miroshin et al. | 428/1.31 |
| 6,803,901 B1 * | 10/2004 | Numao | 345/102 |
| 6,822,711 B1 * | 11/2004 | Yoshida et al. | 349/115 |

(Continued)

FOREIGN PATENT DOCUMENTS

EP 1004921 A1 5/2000

(Continued)

OTHER PUBLICATIONS

Ignatov et al., "Thin Crystal Film polarizers and retarders", 2002, Proceedings of SPIE vol. 4658, p. 79-90.*

(Continued)

*Primary Examiner*—David Nelms
*Assistant Examiner*—W. Patty Chen
(74) *Attorney, Agent, or Firm*—Westerman, Hattori, Daniels & Adrian, LLP (57) ABSTRACT

A liquid crystal display with a backlight is described. The liquid crystal cell comprising a front panel and a rear panel with polarizing means on each panel, and the front polarizing means includes a reflective polarizer and a dichroic polarizer.

16 Claims, 5 Drawing Sheets

U.S. PATENT DOCUMENTS

| | | |
|---|---|---|
| 6,899,440 B2 | 5/2005 | Bierhuizen |
| 6,909,486 B2 | 6/2005 | Wang et al. |
| 6,961,108 B2 | 11/2005 | Wang et al. |
| 7,015,989 B2 * | 3/2006 | Kim et al. ............... 349/63 |
| 7,057,681 B2 * | 6/2006 | Hinata et al. ............ 349/96 |
| 7,142,270 B2 * | 11/2006 | Yamauchi et al. ....... 349/113 |
| 7,144,133 B2 | 12/2006 | Bierhuizen |
| 7,312,913 B2 | 12/2007 | Bierhuizen |
| 7,450,194 B2 | 11/2008 | Lazarev |
| 7,456,915 B2 | 11/2008 | Lazarev et al. |
| 2002/0003593 A1 | 1/2002 | Arakawa et al. |
| 2002/0003594 A1 | 1/2002 | Ishii et al. |
| 2002/0036728 A1 | 3/2002 | Okumura |
| 2002/0051103 A1 | 5/2002 | Faris et al. |
| 2002/0085146 A1 | 7/2002 | Miyazaki |
| 2002/0121848 A1 | 9/2002 | Lee et al. |
| 2002/0141194 A1 | 10/2002 | Wortman et al. |
| 2002/0167811 A1 | 11/2002 | Blanchard |
| 2002/0196385 A1 | 12/2002 | He et al. |
| 2003/0039112 A1 | 2/2003 | Chen et al. |
| 2003/0081402 A1 | 5/2003 | Jeon et al. |
| 2003/0117791 A1 | 6/2003 | Kim |
| 2004/0017348 A1 | 1/2004 | Numao |
| 2004/0051827 A1 | 3/2004 | Hinata et al. |
| 2004/0066471 A1 | 4/2004 | Bierhuizen |
| 2004/0160551 A1 * | 8/2004 | Wang et al. ............... 349/96 |
| 2004/0174692 A1 | 9/2004 | Bierhuizen |
| 2004/0263720 A1 | 12/2004 | Wang et al. |
| 2005/0018106 A1 | 1/2005 | Wang et al. |
| 2005/0195340 A1 | 9/2005 | Lazarev |
| 2005/0200771 A1 | 9/2005 | Lazarev et al. |
| 2005/0212993 A1 | 9/2005 | Lazarev et al. |
| 2006/0187520 A1 | 8/2006 | Bierhuizen |
| 2009/0040431 A1 | 2/2009 | Lazarev et al. |

FOREIGN PATENT DOCUMENTS

| | | |
|---|---|---|
| GB | 2331615 A | 5/1999 |
| WO | WO 9701780 A1 | 1/1997 |
| WO | WO 03023277 A1 | 3/2003 |
| WO | 03/098329 A1 | 11/2003 |
| WO | WO 2004014874 A1 | 2/2004 |
| WO | 2004/049292 A1 | 6/2004 |
| WO | WO 2006038417 A1 | 4/2006 |
| WO | WO 2006092878 A1 | 9/2006 |

OTHER PUBLICATIONS

European Search Report dated Feb. 13, 2009, issued in European Application No. EP 05 77 6925.

Chinese Office Action dated Apr. 4, 2008 issued in corresponding Application No. 200580033547.0.

* cited by examiner

LCD COMPRISING BACKLIGHT AND REFLECTIVE POLARIZER ON FRONT PANEL

RELATED APPLICATIONS

This application claims priority of Provisional Application Ser. No. 60/551,935, filed Mar. 9, 2004.

FIELD OF THE INVENTION

The present invention relates to the field of data display devices. More specifically, this invention relates to liquid crystal displays with backlight systems possessing improved optical characteristics and decreased optical losses.

BACKGROUND OF THE INVENTION

Flat panel displays or liquid crystal displays (LCDs) are popular display devices for conveying information generated by computers. Reduced weight and size of a flat panel display offer great advantages over cathode ray tube (CRT) displays. High-quality flat panel displays are typically backlighted, that is, a source of illumination is placed behind the LCD layers to facilitate visualization of the image. Flat panel LCD devices are used in many applications including the computer industry, where flat panel LCD units are an excellent display choice for laptop computers and other portable electronic devices. However, because of rapid progress in the technology of flat panel LCDs, these devices find increasing use in other mainstream applications such as desktop computers, high-end graphics computers, and television and other multimedia monitors.

A liquid crystal display typically comprises a pair of plates with driving electrodes and a layer of twist nematic (TN) or supertwist nematic (STN) liquid crystal material confined between these plates. The liquid crystal layer thickness and anisotropy are such that it is capable of rotating polarization of a normally incident ray of light for at least one wavelength in the visible spectrum by about 80-1000 (for TN) or 180-230° (for STN). The device further comprises a rear light-entrance polarizer having a transmission axis oriented in a certain direction, a front light-exit polarizer having a transmission axis oriented in a direction different from the former one, thereby defining a normally white or normally black display, and a backlight system. The device may also comprise a rear retardation film situated between the rear polarizer and the twisted nematic liquid crystal layer, and a front retardation film situated between the front polarizer and the liquid crystal layer.

A picture on the display is formed by thousands of small imaging elements, or "pixels", which are either "on", "off", or "partially on". An image is displayed usually by applying an electric field to the individual pixels. In the case of a twist nematic (TN) LCD, if a particular pixel is "on", then the phase and thus the polarization of a linearly polarized light ray will remain unchanged as it passes through the pixel. However, if the pixel is "off", then the polarization plane of the light ray will be rotated, that is, its phase will be modulated so that its polarization angle is changed by 90°. If the pixel is "partially on", then the ray polarization axis will be rotated by less than 90°. An "on" pixel can be designated to represent either black or white. If the "on" pixel is designated as black, then the "off" pixel is designated as white, and vice versa. A "partially on" pixel represents a shade of gray. Polarizers are provided on the LCD so that the polarization state of light passing through a pixel is converted into an appropriate amount of transmission (black, white, or gray).

In the case of a supertwist nematic (STN) LCD, the optical effect is due to birefringence so that each of the "on", "off", and "partially on" pixels have a characteristic birefringence color. If the "blue mode" is used, the "off" pixel will have a blue color, while the "on" pixel will be cream colored. If the "yellow mode" is used, the "off" pixel will be yellow and the "on" pixel will be blue-gray. A film may be added between the STN LCD and one of its polarizers to neutralize the display color, that is, to convert the color display into a black-and-white display.

The flat panel LCD is typically provided with a backlight system. Preferably, the backlight system radiates at least partly polarized light. The most effective system capable of converting all the nonpolarized incident light flux of backlight system into polarized light with minimum losses is offered by the so-called optical recycling scheme with a reflective polarizer.

The reflective polarizer usually comprises a multilayer structure consisting of alternating anisotropic and isotropic layers, with the refractive index of an isotropic layer being equal to that of one of the anisotropic layers. This structure is capable of transmitting light in one polarization state while reflecting light polarized in the perpendicular direction. In one of such structures, the reflected polarized light passes through a quarter-wave plate, changes the polarization direction, reflects from a mirror, and enters the reflective polarizer again, this time in the first polarization state. The reflective polarizer is placed on the backlight system or on the rear plates of the LCD.

Many naturally occurring crystalline compounds act as birefringent (or reflective) polarizers. For example, calcite (calcium carbonate) crystals possess well-known birefringent properties. However, single crystals are expensive materials and cannot be readily formed into the desired shapes or configurations, which are required for particular applications. In the prior art, birefringent polarizers were fabricated (see, e.g., Makas, U.S. Pat. No. 3,438,691) from plate-like or sheet-like birefringent polymers such as poly(ethylene terephthalate) incorporated into an isotropic polymer matrix.

In many cases, polymers can be oriented by uniaxial stretching so as to align the polymer chains on a molecular level as described by Rogers et al., U.S. Pat. No. 4,525,413. Multilayer optical devices comprising alternating layers of highly birefringent polymers and isotropic polymers with large refractive index mismatch have been also proposed by Rogers et al. However, these devices require the use of specific highly birefringent polymers obeying certain mathematical relationships between their molecular configurations and electron density distributions.

There is a known birefringent interference polarizer in the form of a multilayer sheet or film, which can be fabricated from readily available materials using well-established coextrusion techniques. The layers can be made of alternating birefringent and isotropic materials. In this system, one of the two indices of refraction of the birefringent material substantially matches the index of refraction of the isotropic material in the adjacent layer, or the alternating layers can be made of two different birefringent materials selected so that the lower of the two indices of refraction of one of the materials substantially matches the higher of the two indices of refraction of the other material. When adjacent layers of the latter embodiment are both positively or negatively birefringent, then their optical axes should be perpendicular; when the birefringence signs are opposite, the two optical axes should be parallel. To reach the extremely high efficiency previously mentioned, the layers should have an optical thickness equal to one-quarter of the selected light wavelength.

Also known is an LCD containing a reflective polarizer on the rear panel, which represents a multilayer structure containing anisotropic layers made of the same materials.

Examples of diffusely reflecting polarizing materials are described in U.S. Pat. Nos. 5,783,120 and 5,825,543 and in PCT Patent Application Publication Nos. WO 97/32223, WO 97/32224, WO 97/32225, WO 97/32226, WO 97/32227, and WO 97/32230. Examples of multilayer reflective polarizers are described in U.S. Pat. No. 5,882,774. Examples of cholesteric reflective polarizers are described in EP No. 606,940 and U.S. Pat. No. 5,325,218.

Some promising materials for manufacturing anisotropic films are described in U.S. Pat. Nos. 5,739,296; 6,174,394; and 6,563,640. PCT Patent Application Publication No. WO 02/63660 describes methods for manufacturing such films. This invention provides for an increase in the display brightness and makes it possible to obtain images with spectrally clean colors and to create white, black and color components in the image, which allows increasing the contrast and richness of the image, as well as the viewing (aspect) angle of the display.

SUMMARY OF THE INVENTION

The objectives of the disclosed invention are to decrease optical losses in LCD displays and to reduce heating of large displays, for example, displays for home TV appliances.

The Liquid Crystal Display according to the present invention forms an image consisting of pixels occurring in either "on" or "off" states. The liquid crystal display comprises a liquid crystal cell formed by front and rear panels with polarizing means on each of them, and a backlight system comprising a light source and a reflector. The polarizing means on the front panel include a reflective polarizer and a dichroic polarizer, wherein transmittance axes of both polarizers coincide and the dichroic polarizer is placed on top of the reflective polarizer. Further the LCD comprises a feedback system. The brightness of the light source is changed so as to be proportional to the number of "on" pixels of the image, which is provided by the feedback system.

The reflective polarizer is a multilayer stack of layers. Each pair of adjacent layers is characterized by matched refractive indices in one direction in the plane of the reflective polarizer and by substantially different refractive indices in the perpendicular direction. To reach an extremely high efficiency previously mentioned, the layers have an optical thickness of one-quarter of a selected light wavelength.

DETAILED DESCRIPTION OF SPECIFIC EMBODIMENTS

Figure 1:
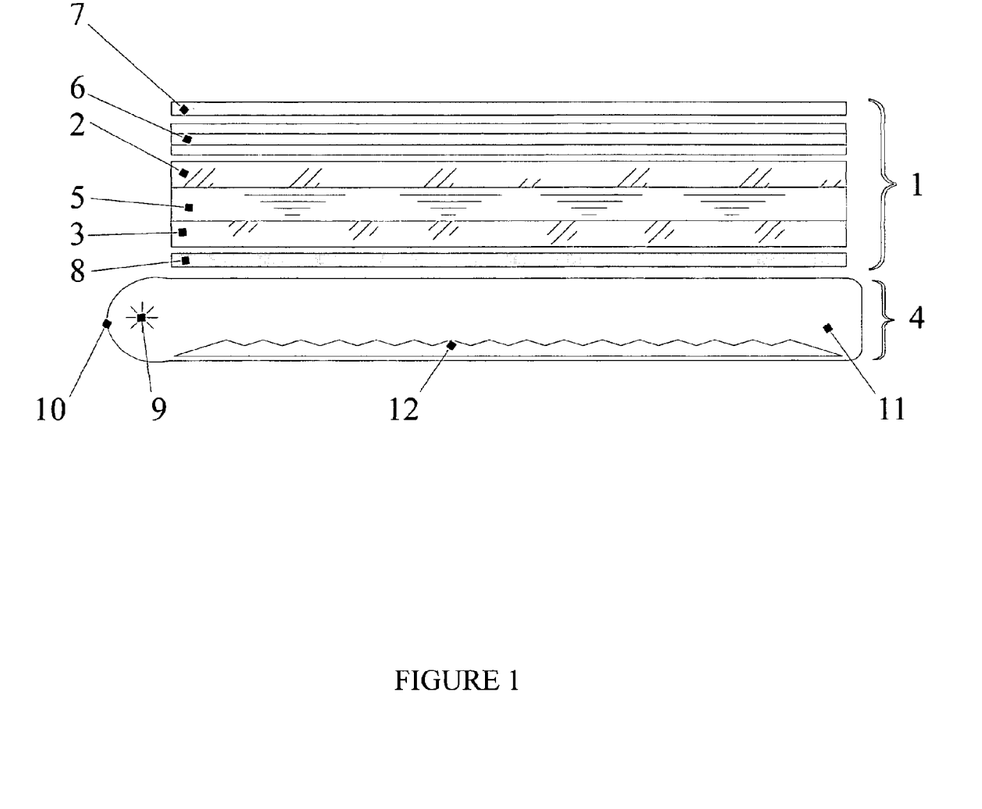
FIG. 1 is a cross section of the liquid crystal display according to the present invention.

FIG. 1 shows a cross section of the LCD that comprises a liquid crystal cell 1, formed by front panel 2 and rear panel 3 with polarizing means on each of them, and a backlight system 4. A layer of liquid crystal 5 is placed between said panels. The polarizing means of the front panel include a reflective polarizer 6 and a dichroic polarizer 7 applied on top of the reflective polarizer. The transmission axes of both said polarizers coincide. The rear panel comprises a linear polarizer 8 of any type.

The backlight system is an optical cavity of the edge backlight type, which includes a lamp 9 in a reflective lamp housing 10. The light emitted by the lamp is fed to a light guide 11 where it propagates until encountering a diffuse reflective structure, or layer 12 such as a spot array. This discontinuous array of spots is arranged to reflect the light and direct it toward the liquid crystal cell. Ambient light entering the optical cavity may also strike a spot or escape from the light guide through the interstitial areas between spots. The diffusely reflective layer 12 is positioned below the light guide to intercept and reflect light rays. In the general case, all the rays that emerge from the optical cavity are incident on the liquid crystal cell.

In one embodiment the backlight system comprises an assembly of light sources representing, for example, a set of luminescent lamps or a LED matrix. A reflector placed behind the backlight system provides for a more effective use of the radiation source. The reflector can be of any type—specular or diffusive. The backlight system may further comprise an additional optical element that serves as a light collimator, for example, an assembly of prisms. This element performs the light collimator function by transmitting rays normal to the plane of the backlight system and simultaneously increases the degree of polarization of the transmitted light.

In still another embodiment the backlight system is also provided with an additional dichroic polarizer placed at the system output or applied on the panel of the LCD.

Another efficient backlight system is provided by a device comprising an anisotropic fluorescent thin crystal film (AF TCF), applied to the surface of at least one element of the backlight system between the light source and the system output. Said AF TCF is formed by means of Cascade Crystallization Process as described below.

The light sources for the backlight for such a system can represent low- or high-pressure gas-discharge lamps, including those possessing a band spectrum, for example Hg, H, Xe lamps, and other similar lamps; high- and ultralow-pressure arc discharge lamps; pulsed plasma discharge lamps; luminescent sources; and any other sources used in similar systems. These light sources usually exhibit at least one intense emission peak in the wavelength range between 260 and 450 nm. The AF TCF is selected so as to provide that the film material possesses a luminescence excitation spectrum with a band corresponding to the above peak in the source emission spectrum. The AF TCF can be colorless (transparent) or colored (absorbing) in the visible spectral range. In the latter case, the film may, depending on the particular optical properties, perform the function of retarding or polarizing the visible light simultaneously with the main function of emitting polarized light.

In addition, the film material can be selected so that AF TCF will emit polarized light within a sufficiently narrow spectral interval. Such films can be used for creating sources of polarized color light, in particular, for color matrices to be used in the backlight systems of color LCDs. Using the backlight system with AF TCF provides for obtaining polarized light on liquid crystal cell and for increasing the light yield at the expense of reduced absorption losses in the internal elements of the system.

A reflective polarizer is placed on the front panel of the LCD. This reflective polarizer comprises a multilayer stack made of materials substantially in the working region of the LCD. Each pair of adjacent layers is characterized by matched refractive indices in one direction in the plane of the reflective polarizer and by substantially different refractive indices in the perpendicular direction. For an effective reflective polarizer, said layers have an optical thickness of one-quarter of the wavelength of light polarized in the direction of the refractive index difference between the adjacent layers.

In a preferred embodiment, at least one layer in each pair is made of a biaxial material with negative birefringence, which has a crystal structure formed by at least one polycyclic organic compound with a conjugated π-system of bonds and an intermolecular spacing of 3.4±0.3 Å is in the direction of one of the optical axes. This material has suitable optical properties comprising a high degree of anisotropy (not less than 0.4) and a large value of the refractive index in at least one direction (greater than 2.2). In addition, the material has good technological properties. A necessary condition is the presence of a developed system of π-conjugated bonds between conjugated aromatic rings of the molecules and the presence of groups (such as amine, phenol, ketone, etc.) lying in the plane of the molecule and involved into the aromatic system of bonds. The molecules and/or their molecular fragments possess a planar structure and are capable of forming supramolecules in solutions. Another necessary condition is the maximum overlap of π-orbitals in the stacks of supramolecules. The material is selected taking into account its spectral characteristics. The material formed from an acenaphtho [1,2-b]quinoxaline sulfoderivative is well suited for these aims, although this material is presented here as one of examples and the materials which might be used for present invention are not limited by using only this compound.

These compounds have a general structural formula where n is an integer in the interval from 1 to 4; m is an integer in interval from 0 to 4; z is an integer in interval from 0 to 6, and m+z+n≦10; X and Y are individually selected from the group consisting of $CH_3$, $C_2H_5$, $OCH_3$, $OC_2H_5$, Cl, Br, OH, and $NH_2$; M is a counter ion; and j is the number of counter-ions in the molecule.

Another name of said layer is thin crystal film or TCF. Said TCF can be obtained by method called Cascade Crystallization Process developed by Optiva, Inc. [see for example P. Lazarev and M. Paukshto, Proceedings of the 7th International Workshop "Displays, Materials and Components" (Kobe, Japan, Nov. 29-Dec. 1, 2000), pp. 1159-1160].

According to this method, an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal film (called thin crystal film, TCF) is formed in the course of subsequent alignment of the supramolecules and removal of the solvent.

Another layer of each pair in the multilayer-stack of the reflective polarizer can be made from a suitable lacquer or polymer.

The reflective polarizer manufactured as described above does not require big number of layers, it also possesses a small thickness, and a high polarizing efficiency.

Figure 2:
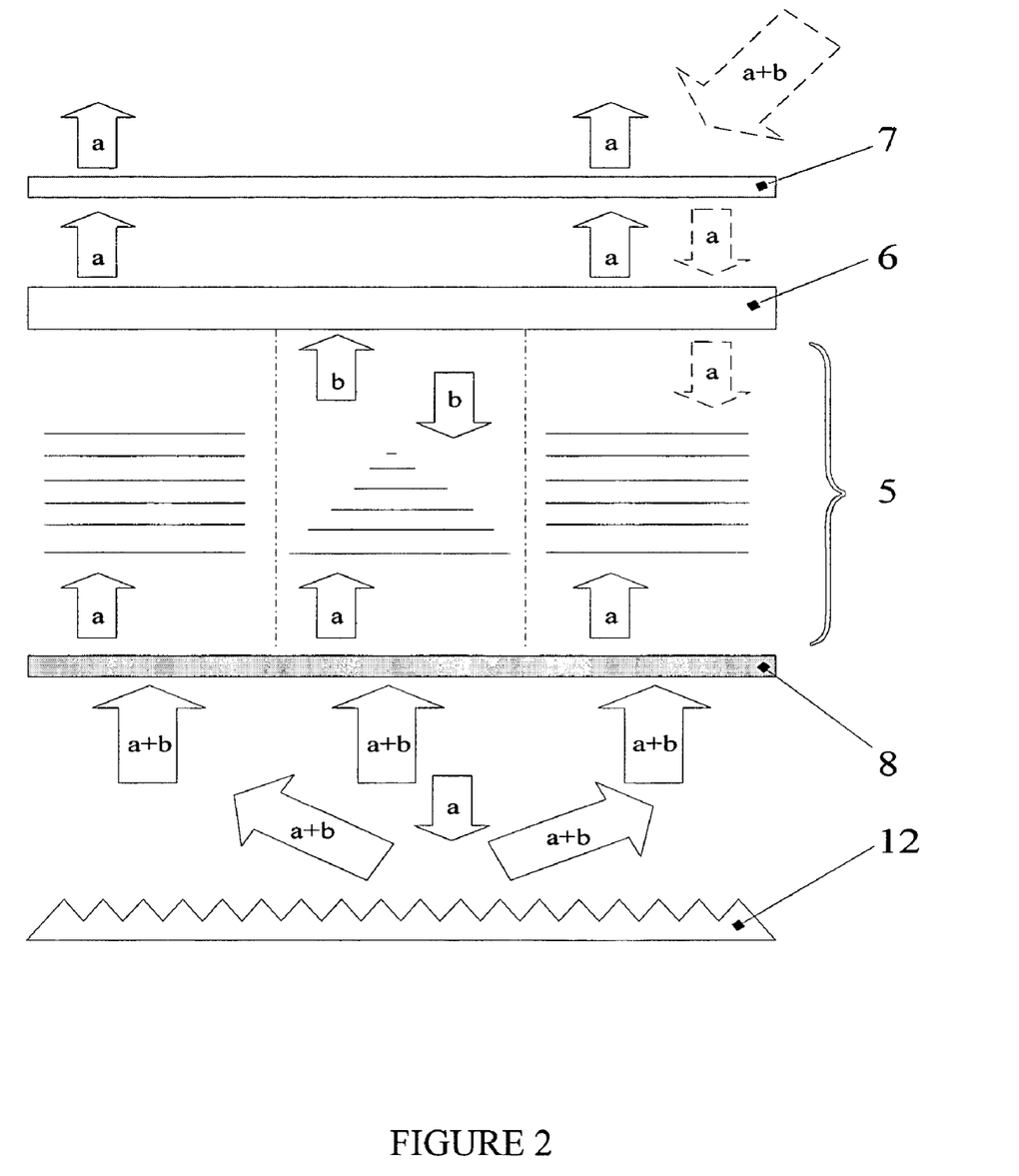
FIG. 2 demonstrates a light propagation in the LCD according to the present invention.

Functioning of the disclosed LCD consists in controlled variation of the state of individual pixels. FIG. 2 illustrates the propagation of light through the display 1. For example, in a 90° TN LCD (FIG. 2), if a particular pixel is "on", then the phase and thus the polarization (polarization mode—a), of a linearly polarized light ray will remain unchanged as it is transmitted through the pixel. However, if the pixel is "off", then the polarization plane of light will be rotated (polarization mode—b), that is, its phase will be modulated so that its polarization angle will change by 90°, and the ray will be reflected from the reflective polarizer 6. This light ray again passes through the liquid crystal layer 5 and strikes the diffuse reflector 12. This light is depolarized (polarization mode—a+b) and re-directed to the liquid crystal cell through this pixel and the rest of pixels. If the pixel is "partially on", then the light ray will be rotated by less than 90°. An "on" pixel can be designated to represent either black or white. If the "on" pixel is designated as black, then the "off" pixel is designated as white, and vice versa. A "partially on" pixel represents a shade of gray. Polarizers are then provided on the LCD so that the polarization state of the light passing through the pixel is converted into the appropriate amount of transmission (black, white, or gray). The light reflected by the interference reflective polarizer is transmitted through the "on" pixel, which increases the LCD brightness. In this way, the power of the light source may be decreased in proportion to the number of "on" pixels of an image displayed on the LCD. The multiple light recirculation effected by the combination of the optical cavity and the reflective polarizer offers an efficient mechanism for converting light from state (b) to state (a) and allocation among "on" pixels for ultimate transmission to the viewer.

The problem encountered in the case when the reflective polarizer is situated on the front panel is the possible appearance of flare spots representing parasitic reflections from external light sources. In order to eliminate such flare spots, an additional dichroic polarizer 7 is placed on the reflective polarizer. When a nonpolarized light (polarization mode, a+b) from external sources is incident on the combination of dichroic and reflective polarizers, the light component with polarization mode (b) is absorbed by the dichroic polarizer, while the component with polarization mode (a) is transmitted inside and utilized. A very small portion of light not absorbed by the dichroic polarizer will be reflected by the reflective polarizer, returned to the dichroic polarizer, and completely absorbed there.

Incorporation of an additional dichroic (absorbing) polarizer into the display structure virtually does not change the magnitude of the useful signal. Since the transmission axes of both polarizers are parallel, the losses of light in polarization state (a) in such a combination are at minimum (below 1%). Thus, the dichroic polarizer in this combination performs a double function: first, increasing the dichroic ratio and second, eliminating flare spots. It is recommended that a dichroic polarizer would have a large viewing (aspect) angle. In particular, thin crystal films based on dichroic dyes may be used.

Figure 3:
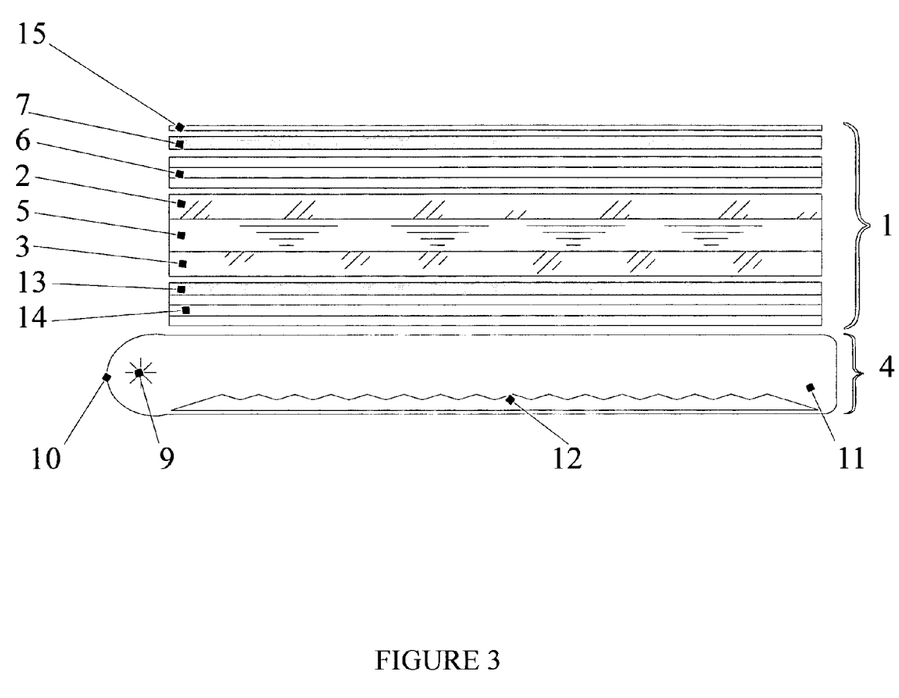
FIG. 3 is a cross section diagram of another LCD according to the present invention.

Liquid crystal displays according to the present invention may have some functional elements made in different variants. The exemplary embodiment in FIG. 3 shows the rear-panel polarizer comprising a combination of dichroic 13 and reflective 14 polarizers with parallel optical axes. In addition, the LCD can be provided with an optional antiglare coating 15.

STN LCD functioning is similar to that described above. The LCD employing super twist nematic liquid crystal comprises a reflective polarizer on the front panel comprising a matrix of colored reflecting elements, each reflecting light in at least a part of the aforementioned spectral region. In the general case, the colors are blue (with wavelengths in the range 400-500 nm), green (500-600 nm), and red (600-700 nm).

Figure 4:
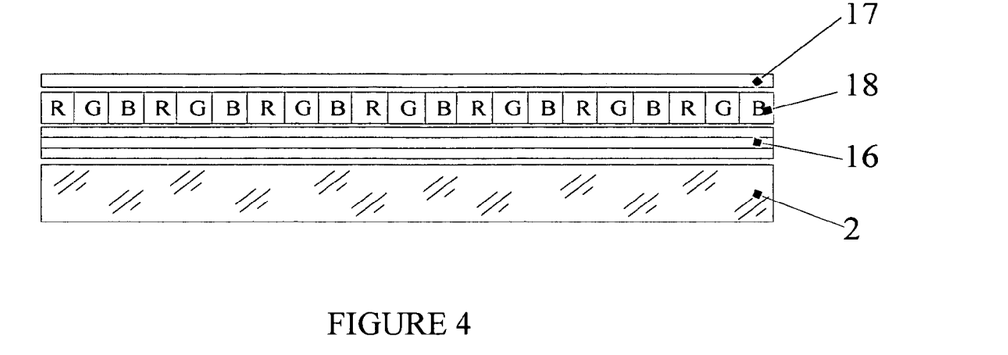
FIG. 4 is a partial cross section of the front panel of the color LCD according to the present invention.
Figure 5:
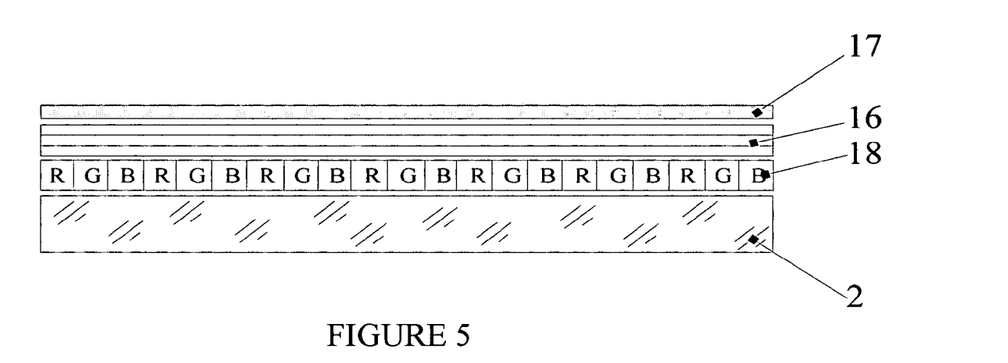
FIG. 5 is a partial cross section of the front panel of another color LCD according to the present invention.
Figure 6:
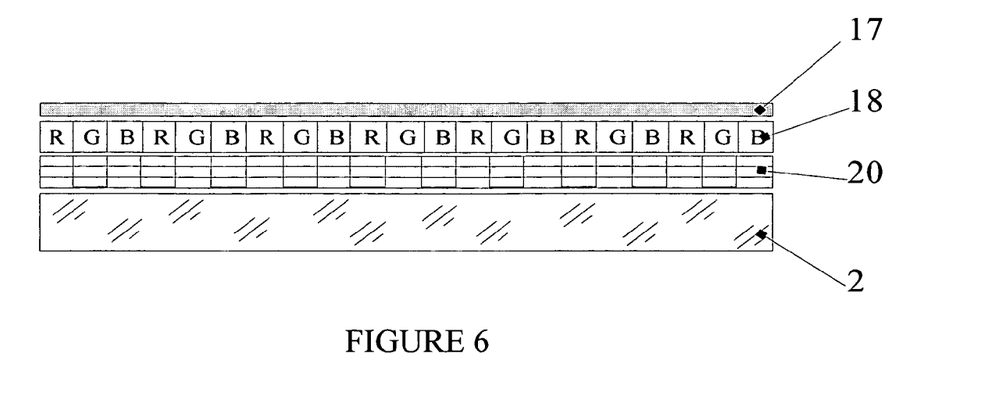
FIG. 6 is a partial cross section of the front panel of another color LCD according to the present invention.

FIGS. 4-6 show different variants of the front panel with a color absorbing filter. In FIG. 4, the front panel comprises broadband reflective polarizer 16, broadband dichroic polarizer 17 and an array of color elements (color filter 18) confined between the two polarizers.

In another variant as shown in FIG. 5, the matrix of color elements is situated between reflective polarizer 16 and front panel 2. The combination of the broadband dichroic polarizer 17 and color filter 18 provides for an increase in the contrast and eliminates flare spots as described above for monochrome LCDs.

In FIG. 6, reflective polarizer 20 comprises an array of color reflecting elements. This polarizer is a multilayer structure composed of elements selected so as to transmit light in a certain spectral interval. In an LCD with such a reflective polarizer, the color filter possesses the corresponding shapes and colors of elements. This filter is situated between the reflective polarizer 20 and the dichroic polarizer 17.

Figure 7:
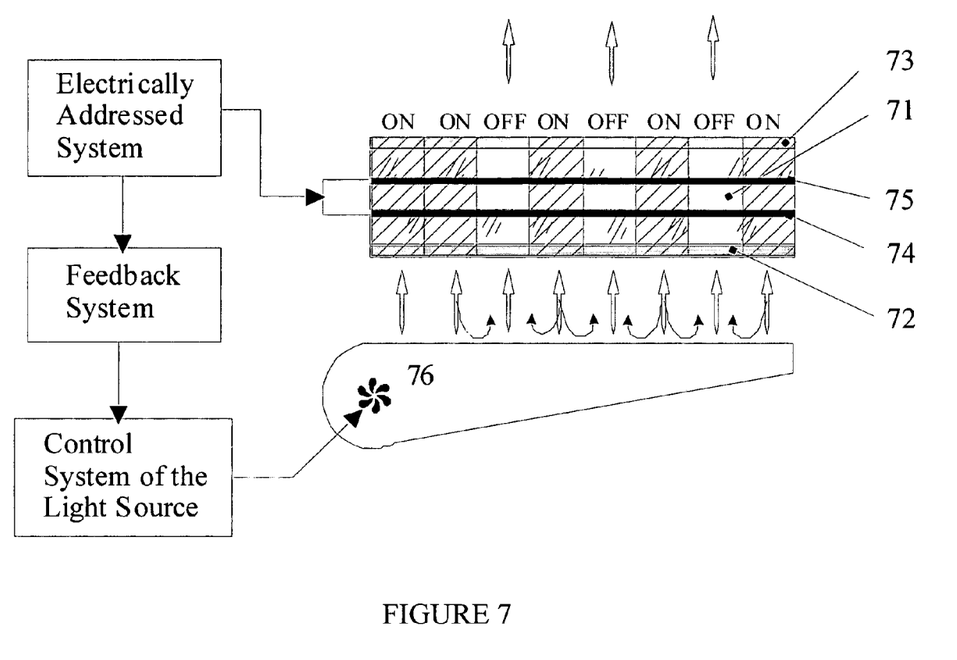
FIG. 7 is a partial cross section of the TN LCD with a 90° twist according to the present invention and feedback system for controlling the brightness of the light source.

The Liquid Crystal Display forms an image consisting of pixels occurring in either "on" or "off" states. In typical LCD, for example TN display with a 90° twist as shown in FIG. 7, the liquid crystal layer 71 is sandwiched between a pair of crossed polarizers 72 and 73. The polarizer 72 is aligned so that the transmission axis is parallel to the director at the input end of the liquid crystal. The analyzer 73—reflective polarizer—is also aligned so that the transmission axis is parallel to the director at the exit end of the liquid crystal. This is known as the normally white (NW) configuration. The inner surfaces of the panels are deposited with transparent electrodes 74 and 75 made of conductive coatings of indium tin oxide (ITO).

In the activated state (voltage ON) when a small voltage (3-5 V) is applied to the electrodes, a strong electric field is built up in the liquid crystal. As a result of the dielectric anisotropy, the liquid crystals are aligned parallel to the direction of the applied electric field. This leads to a zero transmission.

Thus, by application the voltage ON or OFF, we are able to control the transmission of light through the liquid crystal cell.

To control the liquid crystal display, the liquid crystal cell should be electrically addressed. For the display of high content information (e.g., TV and computer monitors), the electrically addressing is achieved by using multiplexing techniques.

The liquid crystal display according to the present invention further comprises a feedback system for controlling the brightness of the light source 76.

The LCD according to the present invention deals with field of "lossless" devices. If the pixel is "off", the corresponding light will be reflected rearward and after redistribution in the device it will be irradiated cross the pixel which is "on". The brightness of light parts of image will be increased. It is necessary to decrease the total brightness of the light source so as to viewer do not see any changes in brightness and in color of the image. The brightness of the light source will be changed proportional to the number of pixels in the "on" state (or inversely to the number of pixels in the "off" state). The control of this process is realized by the feedback system.

The scope of the present invention is not restricted to variants of the display elements described above. Separate elements of an LCD display according to this invention, including the backlight system, dichroic polarizer, reflective polarizer, color filter, etc., may be implemented in any design known in prior art.

What is claimed is:

1. A liquid crystal display for producing an image comprising pixels in the "on" and "off" states, comprising:
    a liquid crystal cell, having a front side and a rear side, comprising front and rear panels with polarizing means on each said panel, and
    a backlight system comprising a light source and a reflector,
    wherein the polarizing means on the front panel include a reflective polarizer and a dichroic polarizer,
    wherein the transmission axes of said reflective and dichroic polarizers coincide and the dichroic polarizer is placed on the front side of the reflective polarizer,
    wherein only one side of said liquid crystal cell comprises a reflective polarizer,
    wherein the polarizing means on the rear panel is not a reflective polarizer, and
    wherein the directions of the transmission axes of said polarizing means on the front panel and the rear panel are perpendicular.

2. The liquid crystal display according to claim 1, further comprising a feedback system ensuring that the brightness of the light source is proportional to the number of pixels in the "on" state.

3. The liquid crystal display according to claim 1, wherein said reflective polarizer on the front panel is a multilayer stack of material layers, and each pair of adjacent layers is characterized by matched refractive indices in one direction in the plane of the reflective polarizer on the front panel and by substantially different refractive indices in the perpendicular direction.

4. The liquid crystal display according to claim 3, wherein said material layers are substantially transparent and have an optical thickness of one-quarter of the wavelength of light polarized in the direction of the refractive index difference between the adjacent layers.

5. The liquid crystal display according to claim 3, wherein at least one of the layers in each pair of said adjacent layers is made of an anisotropic material with negative birefringence, which has a crystal structure formed by at least one polycyclic organic compound with conjugated π-system and an intermolecular spacing of 3.4±0.3 Å in the direction of the extraordinary optical axis.

6. The liquid crystal display according to claim 5, wherein the anisotrophic material comprises an acenaphtho[1,2-b]quinoxaline sulfoderivative.

7. The liquid crystal display according to claim 5, wherein said layer has degree of anisotropy no less than 0.4.

8. The liquid crystal display according to claim 3, wherein the refractive index of one of said layers is greater than 2.2.

9. The liquid crystal display according to claim 1, further comprising an antiglare coating placed on top of the liquid crystal cell.

10. The liquid crystal display according to claim 1, further comprising a color absorbing filter.

11. The liquid crystal display according to claim 10, wherein the reflective polarizer and the dichroic polarizer on the front panel are broadband polarizers and the color absorbing filter comprises a matrix of color elements including three base colors: blue, with the wavelength
in the range 400-500 nm; green, with the wavelength in the range 500-600 nm, and red, with the wavelength in the range 600-700 nm.

12. The liquid crystal display according to claim 11, wherein the color absorbing filter is placed between the dichroic polarizer and the reflective polarizer on the front panel.

13. The liquid crystal display according to claim 11, wherein the color absorbing filter is placed between the dichroic polarizer and the liquid crystal layer.

14. The liquid crystal display according to claim 10, wherein the dichroic polarizer of the front panel is a broadband polarizer and the reflective polarizer comprises a matrix of color reflecting elements, each reflecting in one of the ranges: blue, green or red, and wherein the color absorbing filter comprises a matrix of color elements including three base colors: blue, green, or red, which are suitable to the color reflecting elements.

15. The liquid crystal display according to claim 1, wherein the light source has the emission spectrum with at least one peak in the wavelength range from 250 to 450 nm, and the backlight system further comprises an anisotropic fluorescent thin crystal film absorbing in this range.

16. The liquid crystal display according to claim 15, wherein the backlight system further comprises a polarizer of visible light placed on the anisotropic fluorescent thin crystal film.

* * * * *